Figure 1:
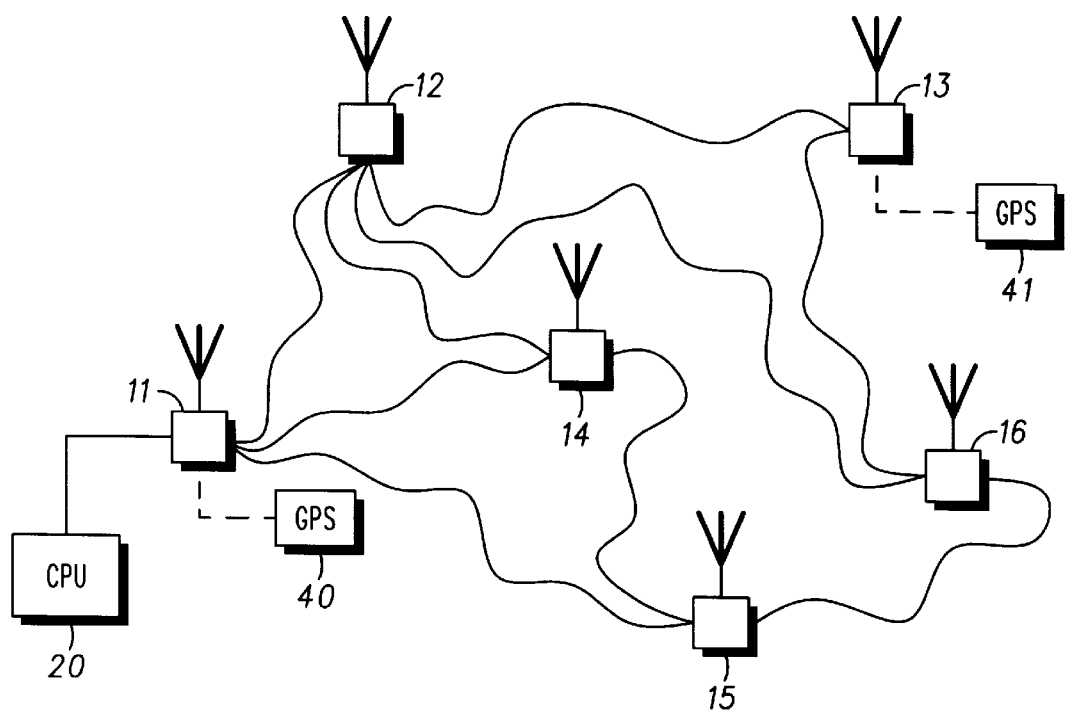

United States Patent [19]
Freeburg et al.

[11] Patent Number: 6,108,315
[45] Date of Patent: Aug. 22, 2000

[54] RADIO NETWORK AND METHOD OF OPERATION WITH LOCATION COMPUTATION

[75] Inventors: Thomas A. Freeburg; Paul Odlyzko, both of Arlington Heights, Ill.

[73] Assignee: Motorola, Inc., Schaumburg, Ill.

[21] Appl. No.: 08/851,759

[22] Filed: May 6, 1997

[51] Int. Cl.$^7$ .................................................. H04B 7/00
[52] U.S. Cl. ..................... 370/310; 455/456; 342/357; 342/450
[58] Field of Search .................................... 342/357, 450, 342/457, 458, 463, 464, 465, 328; 455/67.6, 456, 457; 370/310

[56] References Cited

U.S. PATENT DOCUMENTS

| | | | |
|---|---|---|---|
| 3,518,674 | 6/1970 | Moorehead et al. | 342/457 |
| 3,916,410 | 10/1975 | Elwood | 342/458 |
| 5,512,908 | 4/1996 | Herrick | 342/387 |
| 5,689,270 | 11/1997 | Kelley et al. | 342/357 |

OTHER PUBLICATIONS

Adel Rouz, ATM Implementation for the Third Generation Mobile, 1997 The Institution of Electrical Engineers, Savoy Place, London WC2R OBL, 1998.

*Primary Examiner*—Huy D. Yu
*Assistant Examiner*—Alexander Boakye
*Attorney, Agent, or Firm*—Kenneth A. Haas

[57] ABSTRACT

A method of operation of a network (10) of radio stations (e.g. 11, 12 and 13) in which each radio station communicates with at least two other radio stations. A message (32) is sent and a corresponding reply (35) is received between first and second stations (11 and 12). Similar messages are sent between second and third stations (12 and 14) and the first and third stations (11 and 14). A time delay is measured between sending of each message and receiving the corresponding reply. Distances are calculated between each station and each other station and, from the distances, locations for the second and third stations relative to the first station are calculated.

5 Claims, 2 Drawing Sheets

RADIO NETWORK AND METHOD OF OPERATION WITH LOCATION COMPUTATION

FIELD OF THE INVENTION

This invention relates to a radio network, such as a cellular radio network, a wireless local area network (LAN), a wireless asynchronous transmission mode (ATM) system, or the like. It particularly relates to deriving of location information for radio stations in such a network.

BACKGROUND OF THE INVENTION

In many complex modern radio networks and systems there is a need to establish the locations of radio units or stations in the network. This need can arise in a stationary radio unit, such as a base station, or in a mobile radio unit such as a subscriber unit. For example, in the case of a subscriber unit, location information is used for routing of incoming calls to the subscriber unit, handing off of the subscriber unit from cell-to-cell, controlling power levels and for other purposes. Location information for a base station is used in similar ways.

With the progress of technology from analog cellular radio systems to modern digital cellular radio systems, as well as LANs and specialty radio systems such as military systems, the distinction between a mobile unit and a base station can become blurred. Subscriber units may be fixed and may act as base stations for other subscriber units. Base stations may be mobile.

Proposals have been made for inclusion of a global positioning system (GPS) receiver in each base station, or even each subscriber unit. As the cost of a GPS receiver decreases, this additional feature becomes more attractive, but as the cost of a base station also decreases, there remains a need for a manner of providing location information without additional hardware cost in the system.

Existing methods of measuring of the distance of a subscriber unit from a base station include using a sub audible tone (SAT) which is looped around in an analog subscriber unit in phase with a received coherent SAT. The base station measures the phase shift between the transmitted SAT and the returned SAT to determine the distance of the subscriber unit from the base station. Another method is used in a global system for mobile communications (GSM) system in which the timing of the synchronization word received at a base station is measured relative to a fixed time base at the base station and timing advance is used to instruct the mobile unit to advance or retard its timing so that transmission bursts sent by the mobile unit are received within the correct slots and the base station. Such an arrangement effectively establishes a number of propagation distances between the mobile unit and the base station.

Existing methods for measuring distance between a mobile unit and a base station are very coarse and merely place the mobile unit at a certain radial distance from the base station.

There remains a need for an improved method of establishing location information in a radio network.

A preferred embodiment of the present invention is now described, by way of example only, with reference to the drawings.

BRIEF DESCRIPTION OF THE DRAWINGS

FIG. 1 is an overall schematic diagram of a radio network in accordance with the present invention.

FIG. 2 is a timing diagram showing a forward channel and a reverse channel for two radio stations in the network of FIG. 1.

FIG. 3 is a block diagram of a radio station of the network of FIG. 1.

FIG. 4 is a block diagram of software elements incorporated in the processor of the radio station of FIG. 3.

DETAILED DESCRIPTION OF THE DRAWINGS

A radio network 10 is illustrated in FIG. 1 comprising a number of radio stations. By way of example only, six radio stations are shown, being radio stations 11 through 16. Radio stations 11, 14, 15 and 16 are each coupled by radio links to three other radio stations in the network. Radio station 12 is coupled to four other radio stations. Radio station 13 is coupled to only two other radio stations (stations 12 and 16). Associated with radio station 11 is a central processing unit 20. It will be appreciated that central processing unit 20 may be incorporated within radio station 11 or coupled to it remotely. Central processing unit 20 may be coupled to other radio stations in the network, or indeed to all the radio stations in the network. By way of example only, CPU 20 is illustrated as being connected to radio station 11 and, via radio station 11, it is connected to the other radio stations in the network.

The network can be an analog radio network or a digital radio network. It can be a time division multiple access (TDMA) network or a frequency division multiple access (FDMA) network, a code division multiple access (CDMA) network, or can use any other scheme for sharing the radio resources. Preferably, the scheme used for sharing the radio resources is wireless ATM.

In a wireless ATM system, there is preferably a broad band radio channel used by all the radio stations in the network and communication between stations takes place in short bursts or "cells". A scheme, protocol, or etiquette is used for sharing the broad band radio channel. Such a scheme is described in U.S. patent application Ser. No. 08/641,797 filed on May 2, 1996, assigned to the assignee of the present application and incorporated herein by reference.

Communications between any two radio stations in FIG. 1 (for example, stations 11 and 12) take place as shown in FIG. 2. FIG. 2 shows a forward channel 30, which is the channel from radio station 11 to radio station 12 and a reverse channel 31, which is the channel from radio station 12 back to radio station 11. The figure is not to scale. The forward channel 30 and the reverse channel 31 can be separated in frequency but it is preferred that the same radio frequency spectrum is shared for communication in both directions, in which case the forward channel and the reverse channel are merely logical channels.

Illustrated in FIG. 2 is a message, for example a wireless ATM cell 32, being transmitted on the forward channel. The cell 32 has a synchronization portion 33 at the start thereof. At a time T later on the reverse channel 31, radio station 12 sends a corresponding reply message, for example a wireless ATM cell 35, back to radio station 11. Wireless ATM cell 35 has its own synchronization portion 36. The time T is the round-trip time for communications between the radio stations 11 and 12, measured from the end of the synchronization portion 33 in the forward channel cell 32 to the end of the synchronization portion 36 of the cell 35 on the reverse channel 31. Instead of ATM cells, any other form of packet or datagram may be used as a forward message and a reply message.

A number of factors affect the round trip time T. One factor, for example, is the processing time in radio station 12 required for processing of the cell 32 and formulating of a response. The total round trip time is not relevant to the present invention. Of significance, is that the radio station 11 is able to measure that portion of time T which is due to one-way or round-trip propagation delay of the radio signal between radio station 11 and radio station 12. This can be measured in a number of ways.

One such way is for radio station 11 to insert into cell 32 a time stamp indicating the time of transmission of the cell. Radio station 12 receives this time stamp and inserts a return time stamp in cell 35. The return time stamp is incremented in time relative to the received time stamp so as to indicate the residence time at radio station 12. Radio station 11 receives cell 35 and compares the time stamp contained within cell 35 with a local clock at radio station 11. This comparison gives an accurate indication of the round-trip propagation delay between radio station 11 and radio station 12. By having this propagation delay, a measurement of the distance between the two radio stations is obtained. Further details of time tagging of radio transmissions for the purposes of accurate timing of events at remote radio units can be found in UK Patent No. 2278519.

The scheme described does not require accurate clocks at each of the radio stations to maintain long-term synchronization between the radio stations.

Figure 2:
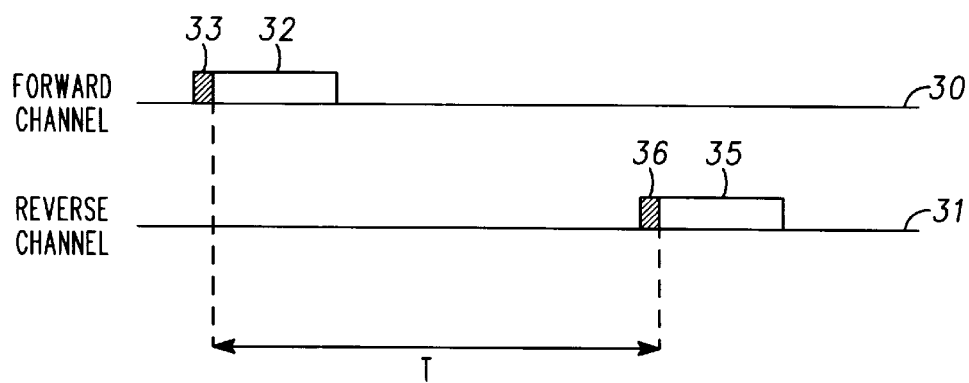

Other schemes can be devised for measuring the propagation time delay between radio stations 11 and 12. Such schemes can include the establishment of a common synchronization timing across the radio network and the measurement at radio station 11 of the synchronization portion 36 relative to the common synchronization timing (i.e. frame boundaries). For example, if cell 35 is transmitted at a predetermined time in a frame (the frame and its frame boundaries not being shown in FIG. 2), radio station 11 can measure the displacement in time relative to the frame boundary of the cell when received.

Having established the propagation delay between radio station 11 and radio station 12, through a single exchange of ATM cells, the process is repeated many times. The accuracy of measurement at radio station 11 is of the order of one bit in the synchronization portion 36 of the received cell 35. Let it be supposed that the bandwidth of the radio channel supports 25 Mbs data rate. At this data rate, one bit is 40 nanoseconds in duration, allowing a distance measurement to an accuracy of 40 feet (12.8 meters). By averaging over 100 measurements, the resolution can be increased ten-fold. By averaging over 1,000 measurements, the improvement is increased approximately 30 times.

It is an advantage of the arrangement that an ATM communication system naturally communicates through exchanges of ATM cells, so that no additional hardware is required to measure the distance of radio station 12 from radio station 11.

Having established the distance between radio station 12 and radio station 11, this distance is stored in CPU 20. Radio station 11 performs similar exchanges with radio station 14 and the resultant distance measured is stored in CPU 20. Radio station 12 performs similar measurements with radio station 14 and transmits its resulting measurements to radio station 11 for storing in CPU 20.

CPU 20 by these means is provided with distance measurements for the distances between radio stations 11, 12, and 14. Note that radio station 14 can also measure its distance from radio station 12 and communicate this distance to radio station 11. Indeed for any link between two radio stations, the length of that link can be measured at both ends. CPU 20 is now able by simple trigonometric calculation to calculate the positions of radio stations 12 and 14 relative to radio station 11, with the only ambiguity remaining being the angular displacement of radio stations 12 and 14 relative to radio station 11.

By similar means, location information for radio stations 16 and 15 is communicated back to CPU 20, for example from radio stations 12, 14 and 11. The location of radio station 13 can also be measured relative to radio stations 12 and 16 and this information can be relayed back to radio station 11, however, the location of radio station 13 can only be resolved by CPU 20 to one of two possible locations, on opposite sides of a line drawn between radio stations 12 and 16. (It may also be noted that in the topography shown in FIG. 1, the location of radio station 16 is ambiguous without another item of information such as the distance of radio station 16 from radio station 14.)

With this information, CPU 20 is able to locate (subject to a few possible ambiguities) the locations of all the radio stations in the network relative to radio station 11. Now, with the inclusion of two absolute location measurements in the network, the absolute locations of all the stations in the network can be measured. Thus, for example, by adding a global positioning system (GPS) receiver 40 to radio station 11 and a GPS receiver 41 to radio station 13, the absolute locations of radio stations 11 and 13 are measured. From this information, the absolute locations of all the radio stations in the network are computed by CPU 20, including the angular location of the network around radio station 11.

GPS receiver 41 is coupled to at least one outlying radio station (beyond radio station 11), such as radio station 13, either temporarily at set-up of the network, or permanently as part of radio station 13. GPS receiver 41 provides absolute location information for radio station 13. Absolute location information for radio stations 11 and 13 can alternatively be pre-set manually into CPU 20.

Location information from radio stations lying remote from radio station 11 (for example, radio stations 13 and 16), as well as absolute location information from GPS receiver 41, is relayed through the network to radio station 11 and to CPU 20 by means well known in the art of network communications, using a Transmission Control Protocol/Internet Protocol (TCP/IP) and an IP address for CPU 20.

Thus a method of operation of a network of first, second and third radio stations (11, 12 and 14) has been described in which each radio station communicates with at least two other radio stations. A message (for example wireless ATM cell 32) is sent and a corresponding reply (for example wireless ATM cell 35) is received between the first and second radio stations, the second and third radio stations and the first and third radio stations. A time delay is calculated between sending of each message and receiving the corresponding reply. Distances between each station and each other station are calculated responsive to the step of measuring and, from the distances, locations are calculated for the second and third radio stations relative to the first radio station.

Figure 3:
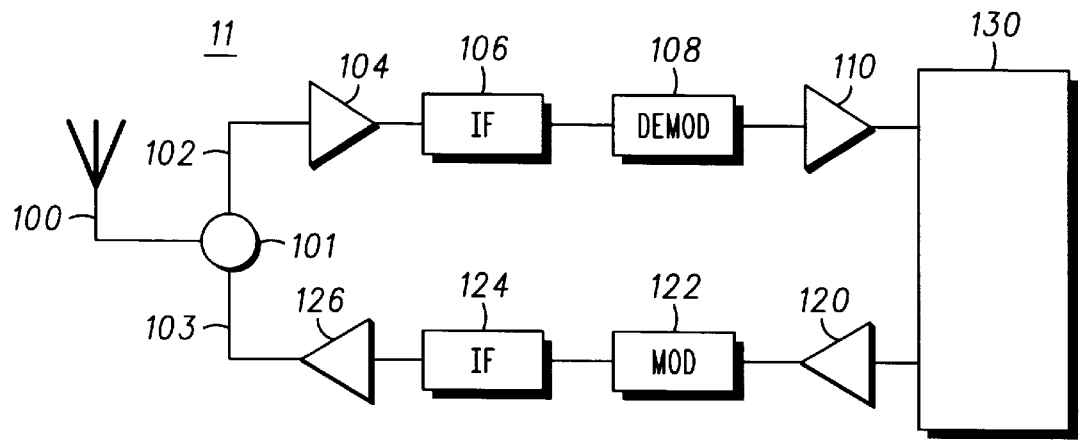

Details of a suitable radio station for implementing the features described above are shown in FIG. 3. The radio station of FIG. 3 is presented by way of example and other implementations are readily apparent to those skilled in the art. The radio station of FIG. 3 is representative of any radio station in the network.

FIG. 3 shows radio station 11 (and equally radio station 12) as comprising an antenna 100 connected to a duplexer or antenna switch or circulator or other antenna connector 101.

The antenna connector 101 is connected to a receive path 102 and a transmit path 103. The receive path 102 comprises an RF amplifier 104, an IF section 106, a demodulator 108, and an analog-to-digital (A/D) converter 110. The transmit path 103 comprises a digital-to-analog (D/A) converter 120, a modulator 122, an IF section 124, and an RF power amplifier 126. Coupled to the A/D converter 110 and the D/A converter 120 is a processor 130, which may be a microprocessor, micro controller, digital signal processor or application specific integrated circuit.

Figure 4:
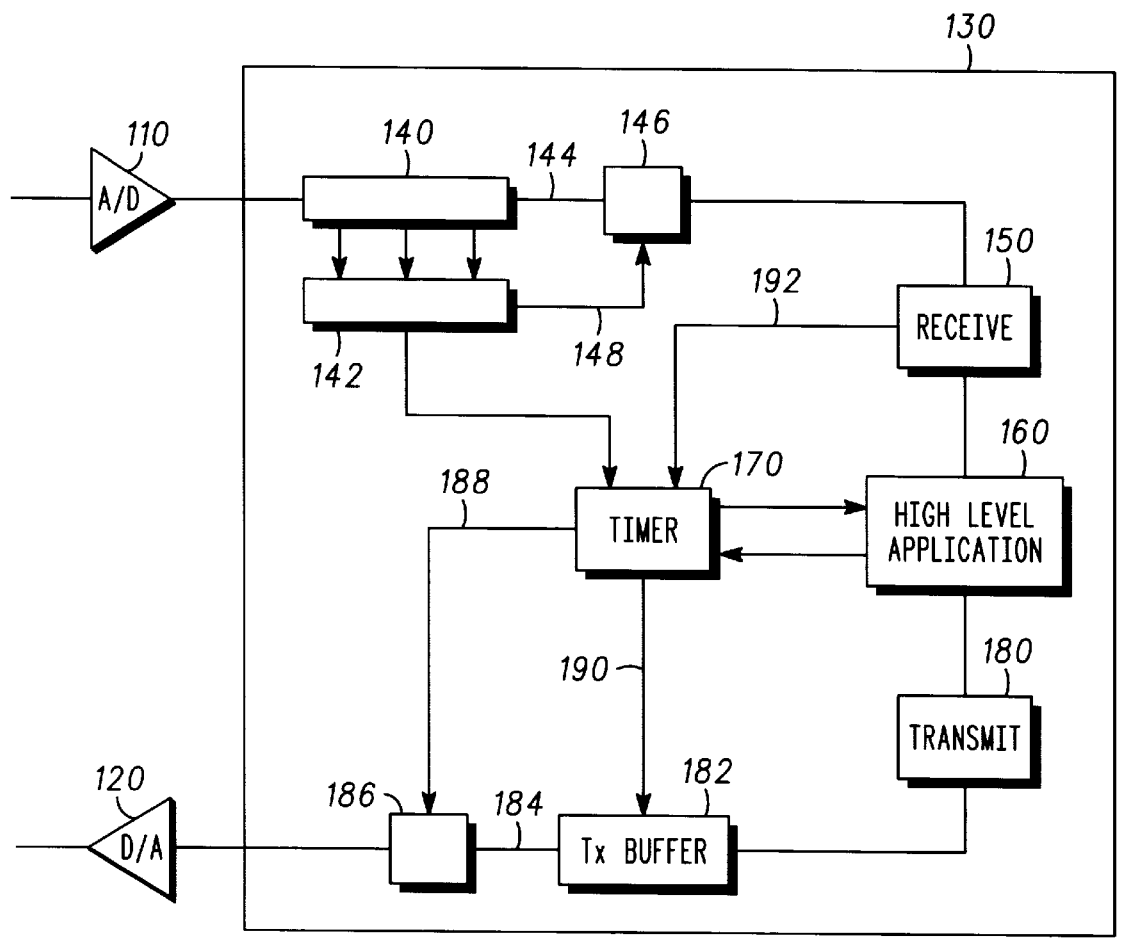

FIG. 4 shows details of the processor 130. The processor 130 comprises, in software, a receive synchronization buffer 140 coupled to a synchronization detector 142. An output 144 of the receive synchronization buffer 140 is coupled to a gating element 146. A timing control output of the synchronization detector 142 is coupled to the gating element 146. An output of the gating element 146 is coupled to receive module 150. An output of receive module 150 is coupled to a higher level application software module 160. A timer 170 is coupled to the synchronization detector 142 and the higher level application module 160. A transmit module 180 is provided, coupled to higher level application module 160 and coupled to a transmit buffer 182. An output 184 of the transmit buffer 182 is coupled to a gating element 186, which is under the control of the timer 170 via timing control line 188.

In operation, data for transmission is provided by the higher level software module 160 to transmit module 180 where an ATM cell is composed for transmission and passed to transmit buffer 182. When ready to transmit, a time stamp is inserted into an appropriate place (e.g. a header) in the cell by timer 170 via connection 190 and the forward channel cell 32 is transmitted from transmit buffer 182. The exact time of transmission is dictated by timer 170 and controlled by gating element 186.

Reverse channel cell 35 is received at radio station 11 in response to the forward channel cell (or in response to many forward channel cells), is demodulated in demodulator 108 and is sampled in A/D converter 110. Samples of the demodulated signal are fed to receive synchronization buffer 140. From receive synchronization buffer 140, a comparison or correlation is made by synchronization detector 142, in which a predetermined synchronization word or pattern is sought in the received samples. When a match is identified, timing control line 148 indicates that symbol timing is achieved and provides a symbol timing clock signal to gate element 146, such that all further samples received are synchronized to a bit level and data can be recovered from receive module 150. (For further details of an arrangement for clock recovery in a received data signal, reference is made to U.S. Pat. No. 5,204,879.) The timing signal provided by synchronization detector 142 is provided to timer 170, providing timer 170 with an accurate indication of time of reception of the reverse channel cell 35. From the receive module 150, a time stamp is extracted from cell 35 and fed to timer 170 via connection 192, indicating the time of transmission of the cell.

From the time of reception of the reverse channel cell and the time of transmission of the forward channel cell 32, timer 170 is able to determine a round-trip time. From the difference between the time stamp extracted by receive module 150 and the time stamp originally inserted into transmit buffer 182, the residence time in the remote radio station (e.g. radio station 12) is calculated. This residence time is deducted from the total round-trip time to calculate the round-trip propagation time. This round-trip propagation time is passed to the higher level application software module 160.

The higher level application software module 160 collects many such round-trip propagation time measurements. It averages these, taking a simple mean average. By averaging many round-trip propagation time measurements, a very accurate measurement of the round-trip propagation delay is obtained. This reduces errors arising from limited bit resolution, transmit and receive delays, multi-path propagation variations and other factors.

Significantly, the scheme does not rely on a clock at each radio station which is accurate for long periods of time. A low-cost, low-accuracy clock can be used, because the clock need only maintain stability during the time between reception of a cell and transmission of a response.

In an embodiment of the invention, radio station 11 transmits a stream of many cells to radio station 12 and radio station 12 transmits a stream of cells in response and time measurements are taken between pairs of cells in the outbound stream and the inbound stream. It is not necessary for one cell to be transmitted and one response to be received before transmitting another cell in preparation for another timing measurement. Any cell can be paired with any return cell, provided that means are provided for deducting from the measured round-trip time the portion of that time resulting from processing at the remote radio station, and provided that bit synchronization timing is measured for each received cell which is to be used for time measurements. (In other words, if data recovery of a later cell depends upon synchronization achieved for an earlier cell, the time of receipt of the later cell will not contribute to increasing the accuracy of measurement of the distance. Only independently synchronized cells will contribute to increasing the resolution of measurement inherent in a scheme relying on bit synchronization).

From the round-trip propagation delay, the distance between the stations 11 and 12 is simply calculated by dividing by two and multiplying by the speed of light. It does not matter whether this calculation is performed in the timer 170 or in the higher level applications 160 or at the central processing unit 20. It does not matter whether this calculation is performed before or after averaging of the many measurements. Individual measurements can be reported to central processing unit 20 and averaged at that unit, but this increases the "overhead" data for the system and is less preferred.

Radio station 11 also sends cells similar to cell 32 to radio station 14 and receives cells similar to cell 35 from radio station 14 and timer 170 measures the round-trip propagation time. Cells to and from radio station 14 are distinguished from cells to and from radio station 12 by having a virtual circuit identifier in a header of each cell which differs from a virtual circuit identifier in cells exchanged between radio station 11 and radio station 12, or by other appropriate addressing scheme. Similarly radio stations 12 and 14 exchange cells and a timer identical to timer 170 in each of these radio stations measures the round-trip propagation time.

Thus, a radio network has been described comprising at least a first radio station 11, a second radio station 12 and a third radio station 13 in which the first radio station has two-way communication with the second and third radio stations and the second radio station has two-way communication with the third radio station. A timer 170 in at least the first radio station, measures round-trip times of messages between the first and second radio stations and between the first and third radio stations and outputs distance data dependent on the round-trip times. A similar timer in at least the second radio station 12, measures round-trip times for messages between the second and third radio stations 12 and 14 and outputs distance data dependent on the round-trip times. The first radio station 11 receives information for a distance between the second radio station and the third radio station and a central processing unit 20 associated with the first radio station calculates, from the distances and the information, locations for the second and third radio stations relative to the first radio station.

The central processing unit 20 has an input coupled to the first radio station 11 which is also coupled at least indirectly to the second radio station 12. The connection can be direct (not shown in FIG. 1). The input of the CPU receives the distance data from at least the first and second radio stations 11 and 12 (or the first and third radio stations 11 and 14). The central processing unit has a location computation process that computes locations for the second and third radio stations relative to the first radio station from the distance data received.

The pricipals are extended for collection of distance data for other radio stations in the network.

Other modifications of detail can be made by one skilled in the art without departing from the scope and spirit of the invention.

What is claimed is:

1. A method of operation of a network a plurality of radio stations including first, second and third radio stations in which each radio station communicates with at least two other radio stations, comprising:

(a) sending a message and receiving a corresponding reply between the first and second radio stations, the second and third radio stations and the first and third radio stations;

(b) measuring a time delay between sending of a message and receiving a corresponding reply;

(c) calculating distances between each radio station and each other radio station, responsive to the step of measuring;

(d) calculating, from the distances, locations for the second and third radio stations relative to the first radio station;

(f) repeating steps (a)–(d) for other radio stations in the plurality of radio stations;

(g) providing absolute location information for the first radio station and absolute location information for at least one other radio station in the network, wherein the least one other radio station included in the step of (f), and the absolute location information for the first radio station and the absolute location information for the least one other radio station is pre-set in the network;

(h) calculating an absolute location of each of the first, second and third radio stations, and the other radio stations included in step (f) from distances calculated between the radio stations and the absolute location information of the first radio station and absolute location information of the least one other radio station in the network.

2. The method of claim 1 further comprising:

sending a plurality of messages and receiving corresponding replies at step (a);

measuring a plurality of time delays between sending of the messages and receiving the corresponding replies;

performing an averaging calculation for the time delays between sending of the messages and receiving the corresponding replies for each pair of the radio stations of step (a); and calculating the distances between each radio station and each other radio station, using results of the averaging calculation.

3. The method of claim 1, further comprising collecting, at a central point, the information obtained at step (b) for performing the steps of (c) and (d) at the central point.

4. The method of claim 1, wherein the absolute location information for the first radio station and the absolute location information for the least one other radio station is measured by at least one global positioning system receiver.

5. The method of claim 1 wherein the message is a wireless asynchronous transmission mode (ATM) cell and the reply is a wireless ATM cell.

* * * * *